United States Patent
Iordanov et al.

(10) Patent No.: US 8,660,986 B2
(45) Date of Patent: Feb. 25, 2014

(54) PRESERVING USER INTENT IN MERGING ORDERED OBJECTS

(75) Inventors: Stoyan Iordanov, Redmond, WA (US); Jonathan Bailor, Bellevue, WA (US); Ethan Bernstein, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 12/913,710

(22) Filed: Oct. 27, 2010

(65) Prior Publication Data
US 2012/0109883 A1 May 3, 2012

(51) Int. Cl.
G06F 17/30 (2006.01)

(52) U.S. Cl.
USPC .......................................................... 707/608

(58) Field of Classification Search
None
See application file for complete search history.

(56) References Cited

U.S. PATENT DOCUMENTS

| | | | |
|---|---|---|---|
| 6,618,725 B1 * | 9/2003 | Fukuda et al. ........................ | 1/1 |
| 2003/0182450 A1 * | 9/2003 | Ong et al. ...................... | 709/246 |
| 2005/0256695 A1 * | 11/2005 | Oh ................................. | 703/22 |
| 2008/0177782 A1 | 7/2008 | Poston et al. | |
| 2009/0125518 A1 | 5/2009 | Bailor et al. | |
| 2009/0241034 A1 * | 9/2009 | Ishizaki et al. ................. | 715/753 |
| 2010/0023505 A1 * | 1/2010 | Tateishi et al. .................... | 707/5 |

OTHER PUBLICATIONS

Munson, et al., "A Flexible Object Merging Framework", Retrieved at << http://citeseerx.ist.psu.edu/viewdoc/download?doi=10.1.1.106.8323&rep=rep1&type=pdf >>, 1994, pp. 231-242.
Ronnau, et al., "Merging Changes in XML Documents Using Reliable Context Fingerprints", Retrieved at << http://csis.pace.edu/~marchese/CS835/Student_Readings/p52-ronnau.pdf >>, Sep. 16-19, 2008, pp. 52-61.
Schwarm, et al., "GOCollab—Peer to Peer Document Collaboration", Retrieved at << http://gnomejournal.org/article/31/gocollab----peer-to-peer-document-collaboration >>, Sep. 15, 2005, pp. 5.
Lindholm, Tancred, "A 3-way Merging Algorithm for Synchronizing Ordered Trees | The 3DM Merging and Differencing Tool for XML", Retrieved at <<http://www.cs.hut.fi/~ctl/3dm/thesis.pdf>>, Sep. 13, 2001, pp. 205.
Wingerd, Laura "Convergence vs. Divergence: Purposeful Merging with Perforce", Retrieved at << http://www.perforce.com/perforce/conferences/eu/2006/presentations/laura_wingerd/ConvergenceVsDivergence.html#ConvergenceVsDivergence.section.10 >>, Aug. 5, 2010, pp. 26.
Bentley, Aaron, "LCA Merge ", Retrieved at << http://doc.bazaar.canonical.com/developers/lca-merge.html >>, Aug. 5, 2010, pp. 3.

* cited by examiner

Primary Examiner — Apu Mofiz
Assistant Examiner — Thu Nga Nguyen
(74) Attorney, Agent, or Firm — Turk IP Law, LLC

(57) ABSTRACT

Algorithms are provided to determine a final sequence of objects based on separating the objects from a base sequence and two derived sequences into common objects appearing in all three sequences and non-common objects missing from at least one of the sequences, then determining the final order of the common objects, and using the positioning of the non-common objects relative to the common objects in the original sequences. The final sequence represents changes made by the two derived sequences to the base sequence.

20 Claims, 9 Drawing Sheets

PRESERVING USER INTENT IN MERGING ORDERED OBJECTS

BACKGROUND

Traditional collaborative editing of documents tends to be performed serially, where two or more users take turns accessing a document, editing the document, and storing edits. The iterative editing process can cause delays since each user may be inhibited from accessing a document while another user is editing the document and the users may have to wait for a turn at editing the document. Additionally, the iterative editing process may make it difficult to keep track of who is editing which portions of a document, which version of a document is the most recent, and when the user will have a turn to access and edit a document.

In other types of traditional collaborative editing, each user can edit a different copy of a document, and subsequently, all of the edited copies may be merged into a single document. This large scale merge also may cause delays, lead to numerous editing conflicts, and/or be difficult to manage. For example, the user responsible for merging the documents may be required to track the relationship between the documents. The user may also be responsible for resolving conflicts among two or more of the edited copies.

Further types of collaborative authoring applications provide an editing environment, where two or more users can edit a document concurrently. Some of these conventional collaborative authoring applications are geared to merge multiple user copies of a document such that a final document represents all of the changes made in the multiple copies of the document. Each user edits a copy of the document, periodically sends updates to a master copy of the document and periodically receives updates from the master copy of the document. These collaborative authoring environments typically inhibit users from providing conflicting editing instructions to the master copy of the document and have a limited set of features allowing them to merge changes made only along the X or Y axis of a document. For example, a collaborative authoring application may merge changes such as a picture added next to a paragraph or a sentence inserted at the end of a paragraph.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to preserving user intent in the arrangement of objects across the X, Y, and Z axes when merging multiple co-authored documents as part of a collaborative authoring application. According to some embodiments, algorithms are provided to determine a final sequence of objects representing the merger of co-authored documents. The final sequence may represent changes made by two or more users to a base sequence in an original document such as rearranging objects, adding new ones, or removing existing objects across X, Y, and Z axes.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
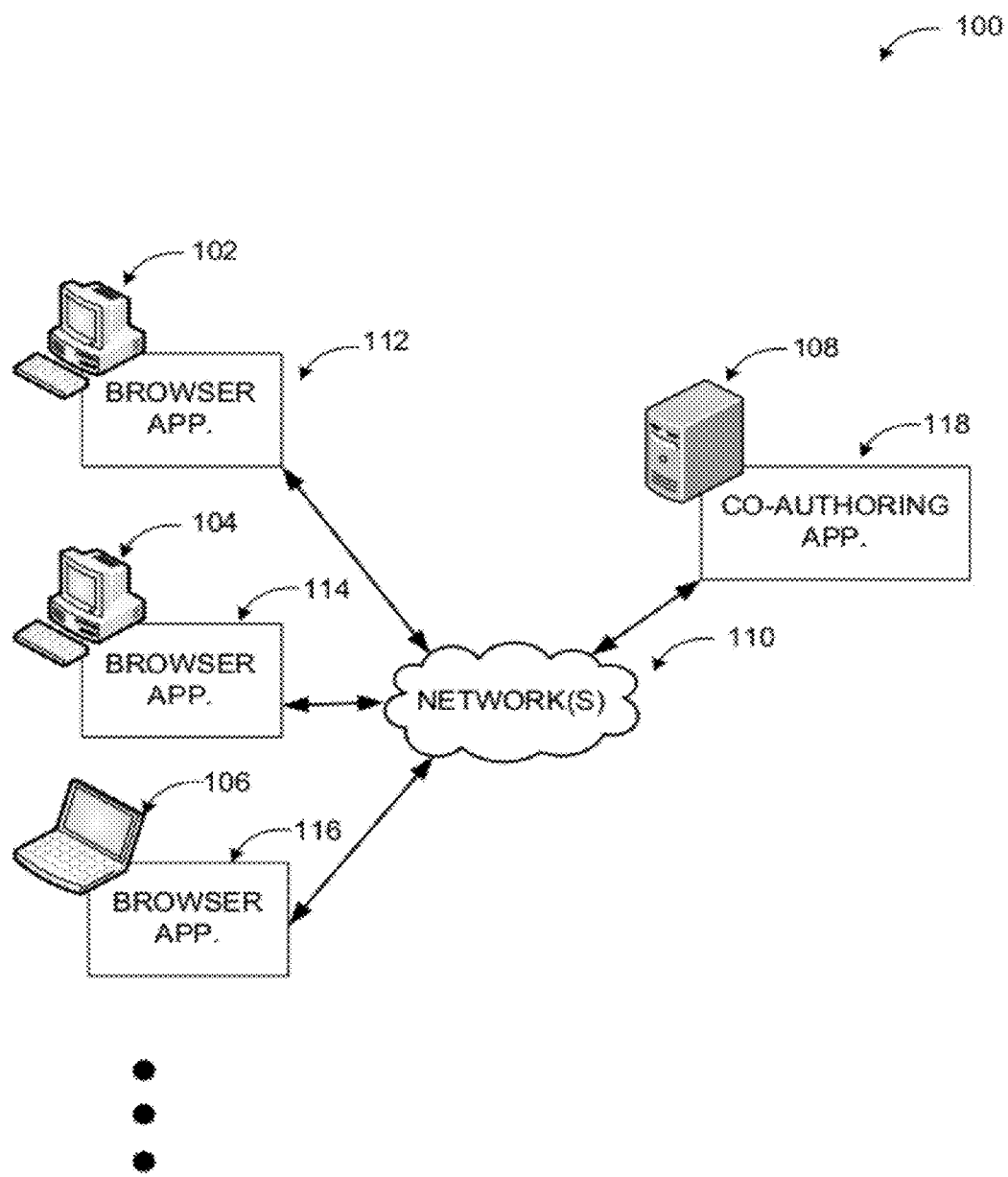
FIG. 1 illustrates a networked collaborative authoring environment, where embodiments may be implemented.

As briefly described above, a final sequence of objects may be produced representing the merger of various changes by users in a collaborative authoring or co-authoring application. The final sequence may be produced based on two different sequences of objects that are derived from the base sequence in the original document. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing collaborative authoring services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example networked collaborative authoring environment, where embodiments may be implemented. The computing devices and computing environments shown in diagram 100 are for illustration purposes. Embodiments may be implemented in various local, networked, and similar computing environments employing a variety of computing devices and systems.

Furthermore, the illustrated scenario is one example among many. According to another example scenario, a number of clients may execute a copy of a word processing application, being connected through a network to a shared services server. Each of the clients' copy of word processing applications is responsible for downloading the latest master copy from the server, comparing this with the locally modified copy of the document, as well as with the base copy (which is a local copy of the latest previously downloaded or uploaded master copy), merging everything into the local copy (i.e. bringing the changes from the master copy into the local copy, but being careful not to overwrite local user's changes), and then uploading the result back to the shared services server, to become the new master copy. Of course, other scenarios may also be used to implement preserving user intent in merging ordered objects. For example, in a mixed scenario, some of the clients may use a web application version of a word processing (or other) application through their browsers, while other clients use a locally installed rich client application. Clients who use the web application may be considered as if they are running the application on the server to edit a document. Each time they save, they invoke methods on the application on the server so that it can make the merge and save to the master copy on the shared services server.

Computing devices 102, 104, 106, are connected over a network 110 to a server 108 where a co-authoring application 118 may enable two or more users to access and edit documents concurrently. Users may access a co-authoring application 118 such as a word processing application, spreadsheet application, and presentation application through a browser 112, 114, 116 executed on each user's computing device 102, 104, 106. The browsers may be configured to access a software platform designed for collaboration, co-authoring, and publishing under a single server 108 such as Microsoft Share-Point® from MICROSOFT CORPORATION of Redmond, Wash. Computing devices 102, 104, 106 may be any computing device including, but not limited to, desktop computers, laptop computers, servers, handheld computers, vehicle mount computers, smart phones, and comparable devices.

The co-authoring application 118 may be any application capable of producing documents such as word processing applications, spreadsheet applications, and presentation applications, in which two or more users may access and edit documents through their browsers. The server 108 may include one or more storage devices to store the master copy of a document. For example, a user may use browser 112 to access a word processing document in a collaborative word processing application executed on server 108, while at the same time a second user may use browser 114 to access and edit the same word document in the collaborative word processing application executed on server 108. As a user accesses a document from the server 108 using his/her browser 112, the server stores a master copy of the document and creates a user copy on the user's computing device 102 for the user's edits. According to another example, the user's copy may still reside on the server. The user's updated copy of the document is then forwarded to server 108 for storage and access by other users. Another user may access the same document concurrently from a browser on his/her computing device, make changes to the copy belonging to the second user (not the first user's copy) of the master document, and save the document to the server to be shared with the other users.

Users may make a wide variety of content and property changes to the shared documents. An example of such changes is placement of objects (textual, graphical, or otherwise) within a document. The original document (master copy) may include, for example, two overlapping objects. A first user may add another object over the first two, while a second user may delete one of the original two objects or change the order of the objects. In such scenarios, preserving the intent of the users in the ultimately updated master copy is one of the tasks of the co-authoring application.

Conventional collaborative authoring or co-authoring applications typically do not address changes made along the Z axis such as embedded objects, overlaid graphics, and similar items, however, some collaborative authoring applications allow modifications to be made on the Z axis in addition to the X and Y axis. For example, graphics may be overlaid on top of each other or changes may be made to text within a paragraph. Preserving different users' intensions when merging along all three X, Y and Z axes is a challenge when such applications are implemented in a collaborative authoring environment when multiple users have access to the same document concurrently.

In a system according to embodiments, the co-authoring application may preserve user intent in the arrangement of objects across the Z axis when merging multiple co-authored documents employing algorithms to determine a final sequence of objects representing the merger of co-authored documents. The final sequence may represent changes made by two or more users to a base sequence in an original document such as rearranging objects, adding new ones, or removing existing objects across Z axis.

Typically, horizontal and vertical movement of objects (i.e., X and Y axes) are related to each other, so either take the position specified by the first user or the one specified by the second user, on both axes may be used. However, the Z axis is distinct from the planar X and Y axes. For example, a user may move an object left or right and yet not change its position on the Z axis. Another user may wish to move the same object along the Z-axis (forward and back relative to other objects) without moving it horizontally or vertically.

Moreover, while horizontal/vertical position of an object does not depend on other objects, which allows each object's X/Y position to be merged independently of other objects, position along the Z-axis is relative to other objects, as it has no meaning on its own—it is only meaningful when compared to the positions of other objects, to determine their relative order—which overlaps which. Thus, all objects are considered at once when merging Z-order in a system according to embodiments. It should be noted that the algorithms described herein are not specific to Z-order. They may be applied to any scenario where orderings of objects need to be merged. Embodiments are also not limited to co-authoring applications.

The example systems in FIG. 1 have been described with specific servers, client devices, applications, and interactions. Embodiments are not limited to systems according to these example configurations. A platform providing user intent preservation in collaborative environments may be implemented in configurations employing fewer or additional components and performing other tasks. Furthermore, specific protocols and/or interfaces may be implemented in a similar manner using the principles described herein.

Figure 2:
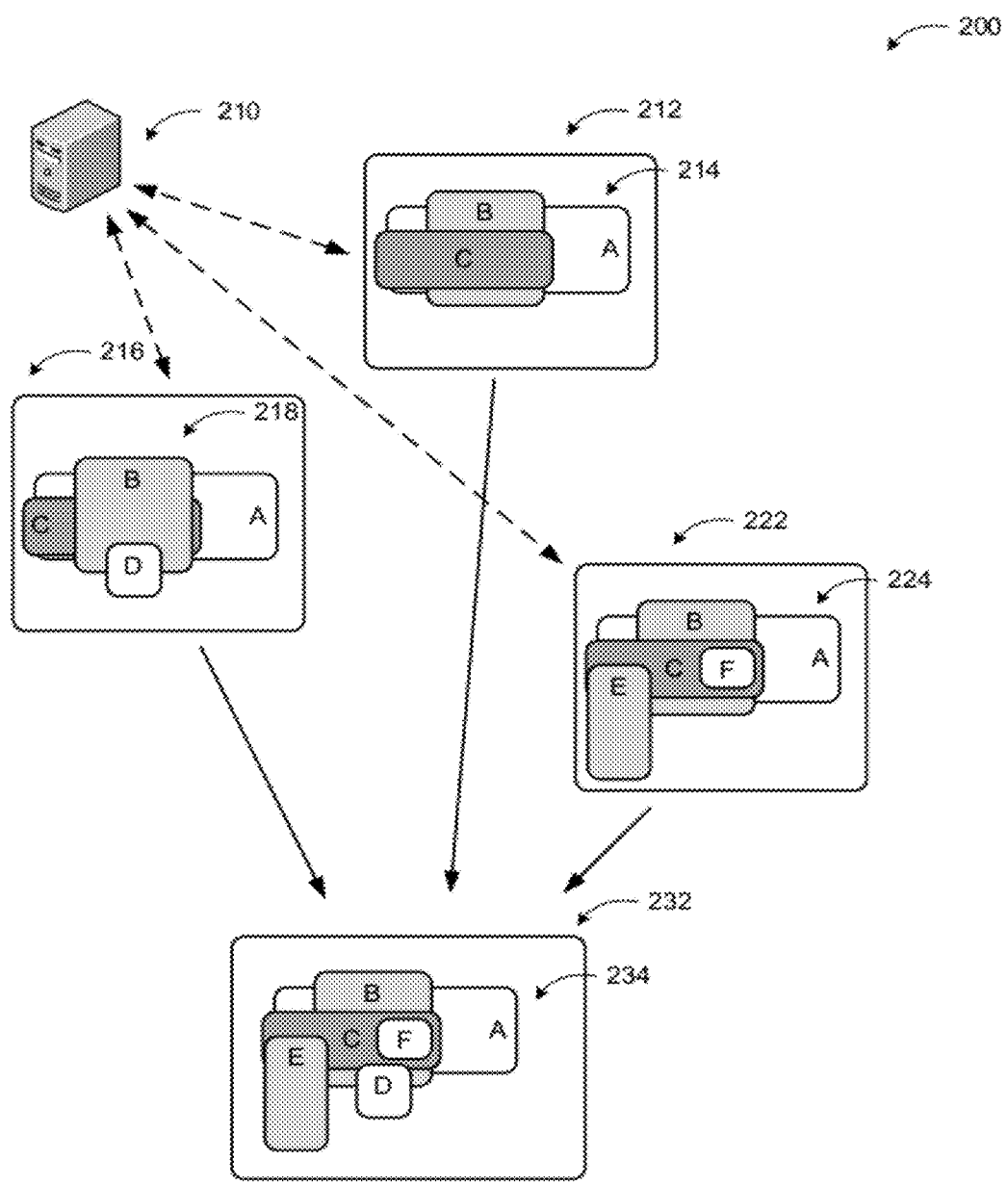
FIG. 2 illustrates an example of a merging three different versions of a document while preserving user intent in arrangement of objects in the different versions.

FIG. 2 illustrates an example of a merging three different versions of a document while preserving user intent in arrangement of objects in the different versions. Embodiments may be implemented in any environment in which multiple users can collaboratively author a document. A co-authoring application executed on server 210 of diagram 200 may manage a document 212 with a group (214) of three objects A, B, and C, which are positioned as overlapping objects. Thus, the positions of the objects has significance not only along the X and Y axes (page plane), but also along the Z axis (perpendicular to the page plane). Document 212 may be a master copy prior to changes being made by the users.

Documents 216 and 222 represent modified versions of document 212 with new objects D and E, F added, respectively. An ordering of the object groups 218 and 224 are also different in documents 216 and 222, respectively, compared to document 212. Employing an algorithm separating the objects in each version to common and non-common objects and then determining a final order of the objects based on the original sequence of objects, the co-authoring application preserves user intent. To accomplish that, the algorithm may specify one of the "derived" sequences of objects in the documents 216 and 222 as the primary and the other as the secondary.

According to an example scenario: computer A (shared services server) may maintain the master copy of the document. Computer B (a user) may download a local copy of the document to allow a user to edit it. Computer B may also make a second copy of the document, which it may designate as "base". The base document resides on computer B, but the user does not see and cannot edit it. Computer C (a second user) may do the same—download a local copy, and make a second "base" copy, both residing on computer C. User on computer B may make an edit and save the document. At this point, computer B may download the latest copy of the master document from computer A, denoted as the "server" copy. Computer B may compare the downloaded server copy, local copy (edited by the user), and base copy. If computer B finds any differences between the server copy and the base copy, it may merge them into the local copy, but being careful not to override differences between the local copy and the base copy. This achieves is a merger of changes made by other users on the server into the local copy, merging them with the local user's changes.

Computer B may then upload the newly merged local copy onto computer A. This becomes the new master copy of the document. Computer B may also copy this newly merged local copy onto the base copy; this way it is going to become a baseline for further comparisons later on. If the user on computer C makes a change and saves, computer C may download the latest copy of the master document from computer A. This may be called the "server" document. It should be noted that this is the same document that computer B uploaded earlier, so it includes the first user's changes. As computer B did earlier, computer C may compare its base, server, and local copies, merge differences between server and base into the local document, and upload the merged local document onto computer A, to become the new master copy. Now the master copy on computer A contains both users' changes. At some point later on, computer B may download the master copy, do a new merge, and may now also have computer C's changes.

Thus, the master copy is the document that is on the server. The local copy is the working copy of the document that each user is editing, normally stored on their own computer (though that might not be true when using the web applications). And, the base copy is another copy stored locally on each user's computer; it represents the last known position when the local copy and the master copy were the same.

Figure 3:
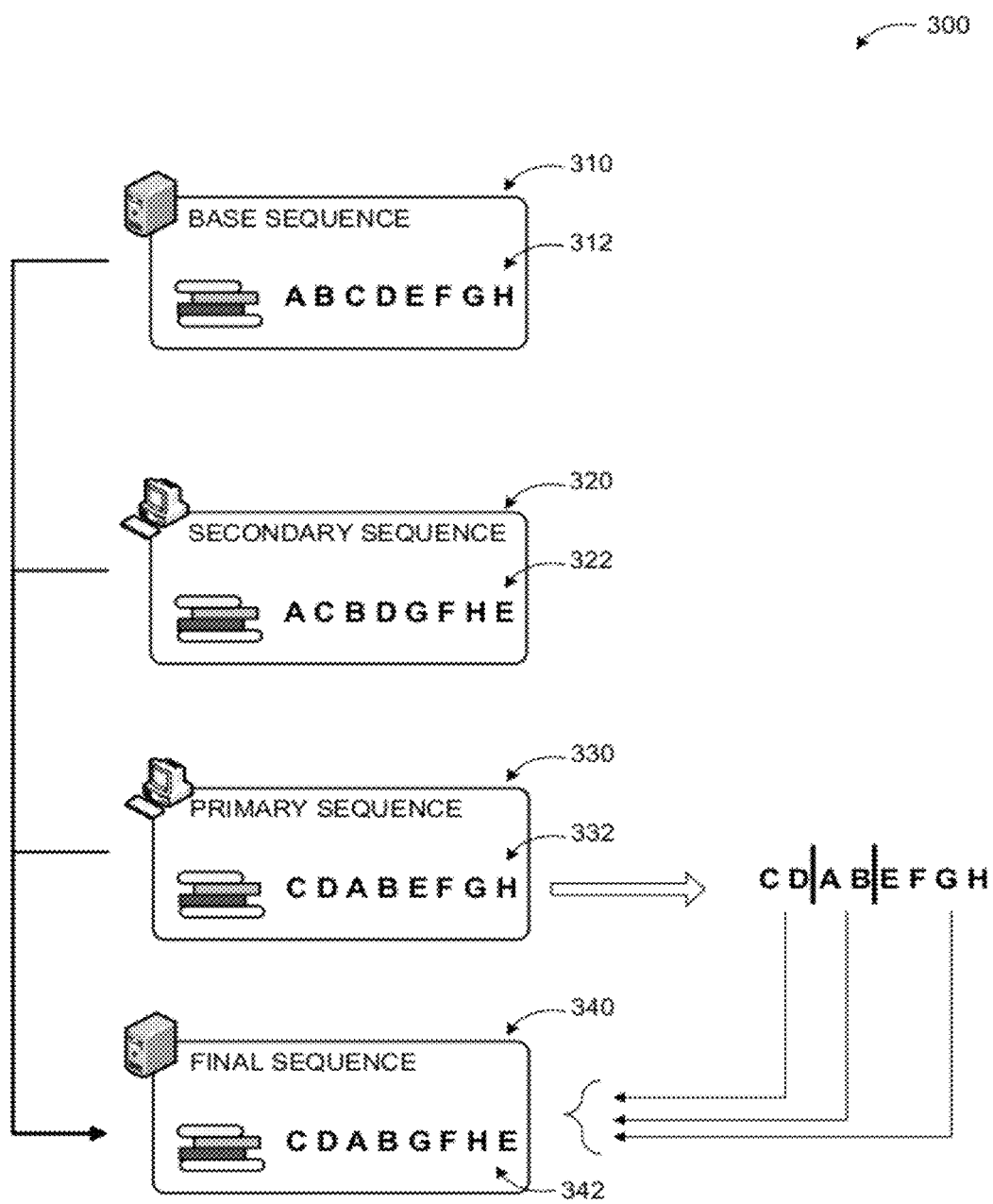
FIG. 3 illustrates an example document merger employing base, primary, and secondary sequences for preserving object arrangement in the document.

FIG. 3 illustrates an example document merger in diagram 300 employing base, primary, and secondary sequences for preserving object arrangement in the document. The algorithms described in FIGS. 3 and 8 assume no addition or removal of objects, just reordering. In contrast, the algorithms discussed in conjunction with FIGS. 4 and 7 involve addition and/or removal of objects. As noted above, different sequences of objects may be represented as a base sequence 310 and two that are derived from the base sequence by means of rearranging the base sequence's objects, adding new objects, or removing existing objects. An algorithm according to some embodiments attempts to merge the changes from the two derived sequences with respect to the base sequence into a new, final sequence, which represents, both derived sequences' changes to the base sequence. Because changes in each of the derived sequences may conflict with changes in the other, one of the derived sequences may be designated as primary sequence 330 and the other as the secondary sequence 320. When conflicting changes are encountered, the changes in the primary sequence 330 may be used.

When a user, while co-authoring on a document, saves the file, their changes to the file need to be merged with the potential changes of other users made to the document on the server. In this scenario, one of the input sequences to the algorithm may represent the ordering of objects in the user's document as it was just before a save operation was triggered; the second input sequence may represent the ordering of objects in a latest version of the document on the server; and the third, base input sequence may represent the ordering of objects in the last common version of the document from which the user's and the latest server version both diverged. It should be noted that embodiments are not limited to co-authoring applications, and may be employed in merging any ordered objects.

The algorithm may then separate the primary sequence 330 into groups, attempt to match the groups to counterparts in the secondary sequence 320 by looking for groups of consecutive objects in the secondary sequence which are a permutation of their respective group in the primary sequence, and form final sequence 340. Thus, if there is a matching permutation in the secondary sequence, that permutation is used as a component of the final sequence; otherwise, the group from the primary sequence is used as a component of the final sequence. In an example scenario, base sequence 310 may include an order of objects A, B, C, D, E, F, G, H (312). The primary sequence may include the objects ordered as C, D, A, B, E, F, G, H (332). The secondary sequence may include the objects ordered as A, C, B, D, G, F, H, E (322).

The primary sequence 330 may be split into three groups, where the order matches the base: C, D; A, B; and E, F, G, H. Of these groups C, D and A, B do not have matching counterparts (or permutation groups) in the secondary sequence 320, while the group E, F, G, H has a matching permutation group G, F, H, E in the secondary sequence 320. Thus, the permutation group G, F, H, E of the secondary sequence 320 may be used resulting in the final sequence 340 as C, D, A, B, G, F, H, E (342). Also, 1-element groups may also be used if a bigger group cannot be formed with the lone object in question. For example, if the primary sequence was CADBEFGH, it may be split as C|A|D|B|EFGH.

Figure 4:
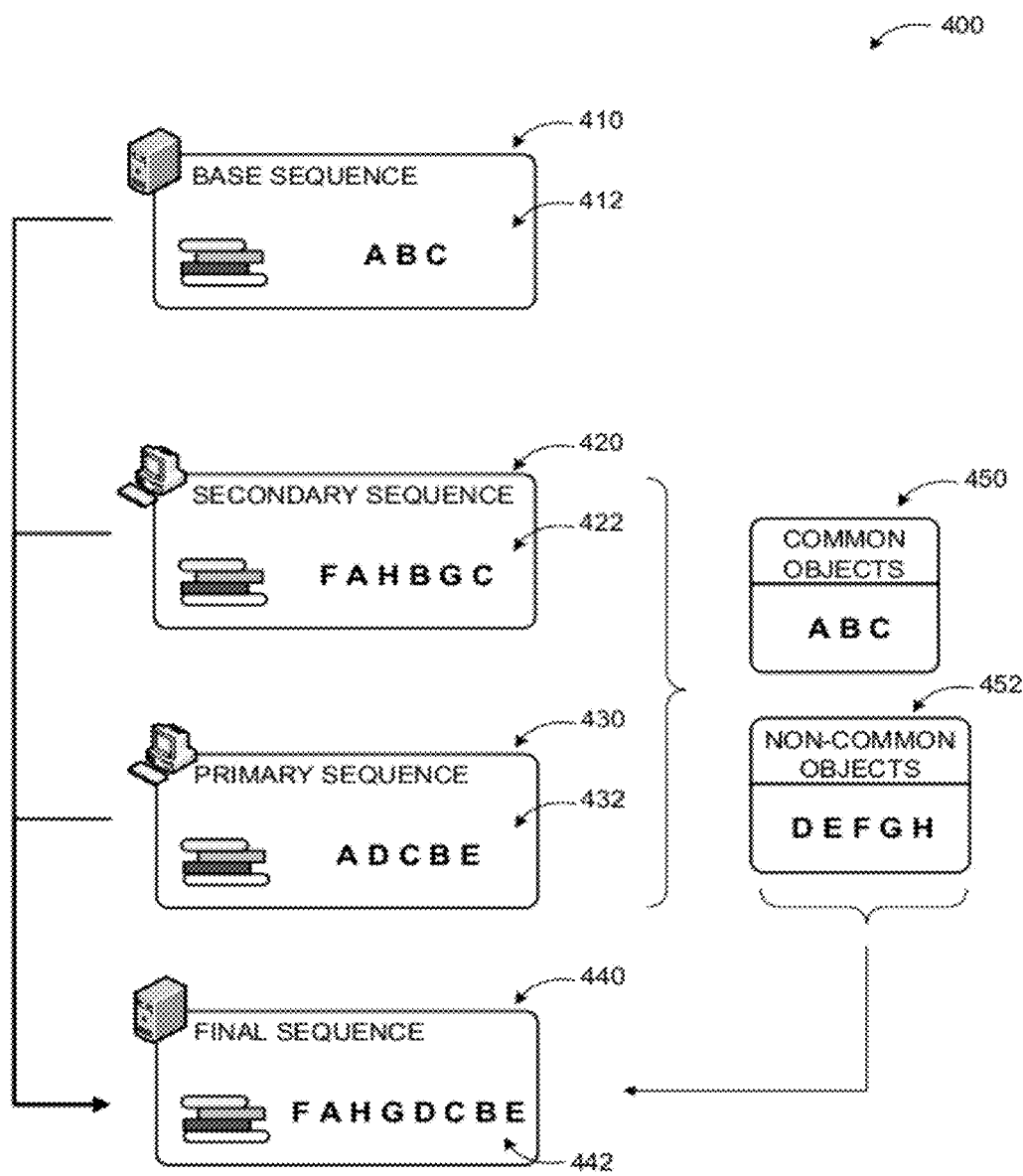
FIG. 4 illustrates another example document merger employing base, primary, and secondary sequences for preserving object arrangement in the document, where objects are added and/or removed.

FIG. 4 illustrates another example document merger employing base, primary, and secondary sequences for preserving object arrangement in the document, where objects are added and/or removed. Diagram 400 also illustrates a base sequence 410, a primary sequence 430, a secondary sequence 420, and the final sequence 440 preserving user intent.

Figure 8:
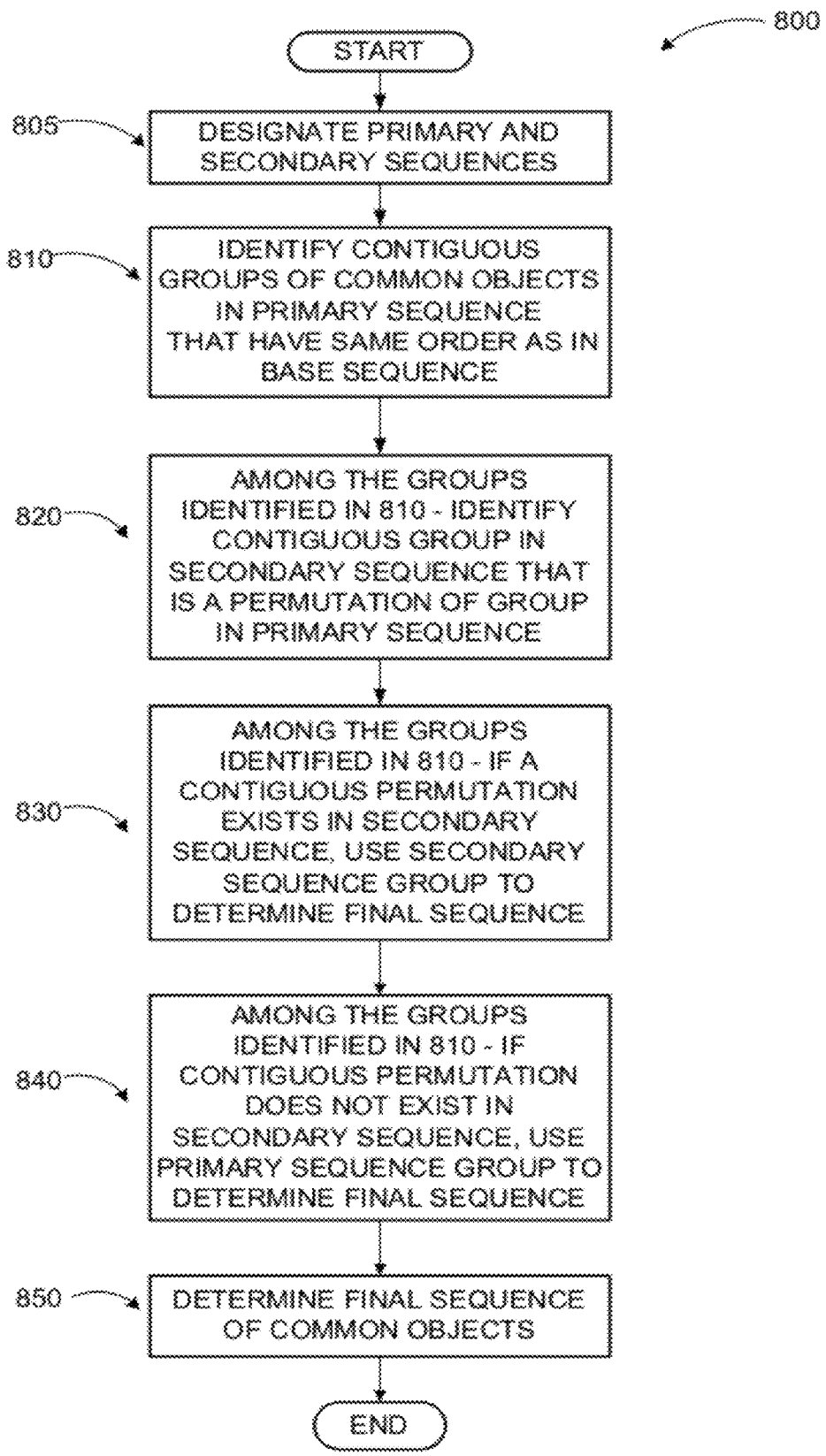
FIG. 8 illustrates a logic flow diagram for determining the final order of common objects in co-authored documents according to embodiments.

The objects from the three sequences may be categorized in a first stage into two groups: common objects, which appear in all three sequences, and non-common objects, which are missing from at least one of the sequences. For example, objects which were added in either of the derived sequences (primary or secondary), or removed by either or both of them with respect to the base sequence may be classified as non-common objects. Next, a final sequence of the common objects may be determined I a second stage (as shown in FIGS. 3 and 8) based on the common objects alone representing changes made to the base sequence. Then, the complete final sequence may be determined in a third stage using the positioning of the non-common objects relative to the common objects in the original sequences.

According to an example scenario, two sequences "ABDC" and "ACBE" may be derived from a base sequence "ABC". "ABDC" is derived from "ABC" by adding the object "D" just before "C", whereas "ACBE" is derived by swapping "C" and "B" and then adding a new object "E" right after "B". In this example, "A", "B" and "C" are "common" objects, since they exist in all three sequences. In contrast, "D" and "E" are "non-common" objects, as they do not exist in all three sequences.

By separating the objects into common and non-common groups, the algorithm does not have to deal with some objects appearing on some of the sequences but not in others. Thus, at second stage of computation, where a final sequence of common objects is determined, there are three sequences (one base and two derived from it by means of rearranging objects). The final sequence that represents both derived sequences' changes with respect to the base sequence can be determined without having to consider added or removed objects.

This second stage of computation may include splitting the primary derived sequence into groups of contiguous objects whose internal order matches the base sequence's order, trying to find in the secondary derived sequence a matching group that is a permutation of the primary sequence's group for each group of the primary sequence. If a matching group exists, it may be used to form the final sequence of common objects. If a matching group does not exist, the group from the primary sequence may be used to form the final sequence.

At the third stage of computation, where the complete final sequence is determined using the positioning of the non-common objects, the algorithm may refer to the original input sequences and determine, for each non-common object, which common object is just before or just after in the sequence. By consistently choosing one of these alternatives, the complete final sequence may be produced, where each non-common object is inserted just before or just after the same common object in the sequence produced on the second stage of computation. While doing so, the algorithm may preserve the relative order of non-common objects that originate from the same derived sequence. For example, if two non-common objects can both be found in the primary derived sequence, one being before the other, the algorithm may preserve this relative order of these two objects with respect to each other in the final sequence.

Preserving the relative order of the non-common objects in the final sequence may be achieved by either pushing backward any non-common objects which are out of position until the internal order of the non-common objects has been restored, or by pushing them forward. When two non-common objects' order cannot be determined relative to each other because they originate from different input sequences and both are before/after the same common object, one of the derived sequences may be consistently selected to have precedence, with the non-common object that originates from it ending up after the non-common object originating from the other derived sequence.

Returning to diagram 400, the example base sequence 410 includes ordered objects "ABC" (412), primary derived sequence 430 includes ordered objects "ADCBE" (432), and the secondary derived sequence 420 includes ordered objects "FAHBGC" (422). Objects "D", "E", "F", "G" and "H" are non-common objects 452, "D" being before "E" in the primary derived sequence and "F" and "H" being before "G" in the secondary derived sequence. The final sequence of the common objects 450, as produced by the secondary stage of computation, is "ACB". To produce the complete final sequence, it may be noted that in the secondary sequence, the non-common object "F" comes just before the common object "A", "H" comes just before "B", and "G" comes before "C". Preserving this relationship while inserting the objects into the order "ACB", results in the sequence "FAGCHB". However, this order reverses the order of "H" and "G". To correct this, either "H" may be moved until it ends up before "G", or "G" may be moved until it ends up after "H". If the former approach is chosen the final sequence may be "FAHGCB". In the primary sequence, "D" comes before "C" and "E" comes last. Preserving this relationship in the primary sequence into the order "FAHGCB" results in the final sequence 440 with ordered objects "FAHGDCBE" (442). It should be noted that "D" is inserted after "HG", i.e. objects coming from the primary sequence are placed after ones coming from the secondary. According to some embodiments, the opposite approach may be selected as long as the choice is made consistently. Thus, for this example, the final sequence produced by the solution may have been "FAHGDCBE". It should be noted that an alternative approach is to look which common shape the non-common shape is after (instead of before). For example, F is at the beginning of the sequence, H comes just after A, G comes just after B, etc.

The examples in FIG. 2 through 4 have been described with specific configurations and object orders. Embodiments are not limited to systems according to these example configurations. Preserving user intent in the arrangement of objects may be implemented in configurations using other types of documents, applications, object orders, and configurations in a similar manner using the principles described herein.

Figure 5:
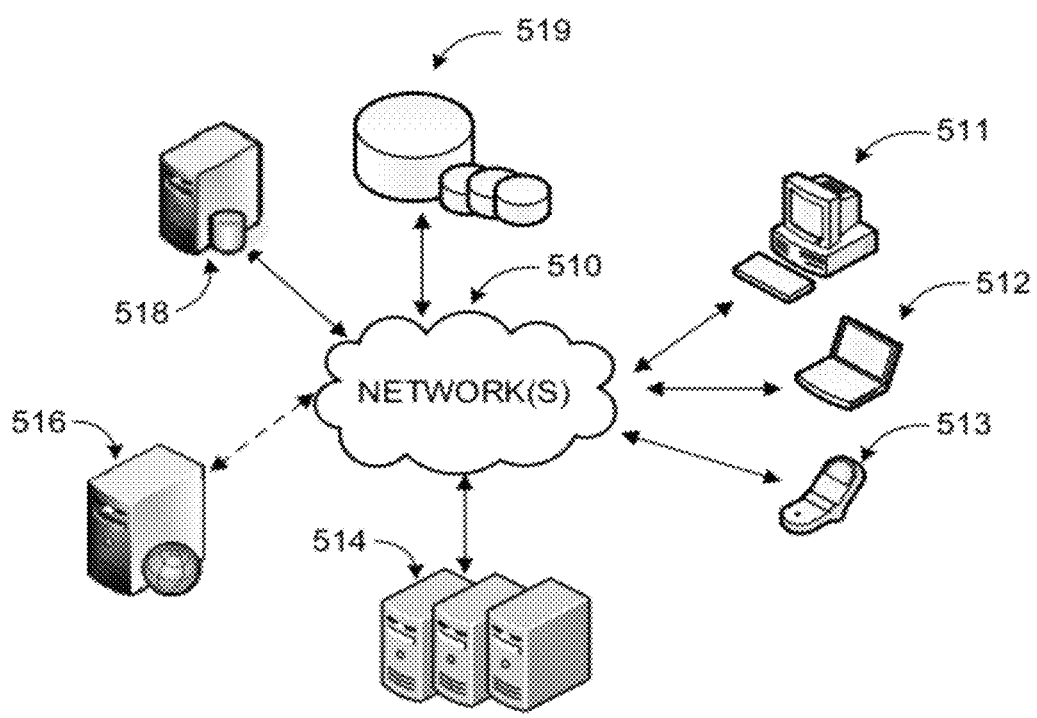
FIG. 5 is a networked environment, where a system according to embodiments may be implemented.

FIG. 5 is an example networked environment, where embodiments may be implemented. A system for the arrangement of objects (e.g. when merging co-authored documents) may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A co-authoring application executed on one of the servers or a client device may facilitate the merging of derived sequences from a co-authored document through the arrangement of objects from the base and derived sequences. The application may implement algorithms to identify common and non-common objects and to arrange the common and non-common objects in order to determine a final sequence of objects for the merging of co-authored documents. The configuration application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing for the implementation of algorithms to determine a final sequence of ordered objects (virtual or physical), for example, representing the merger of co-authored documents. Furthermore, the networked environments discussed in FIG. 5 are for illustration purposes only. Embodiments are not limited to the example applications, modules, or processes.

Figure 6:
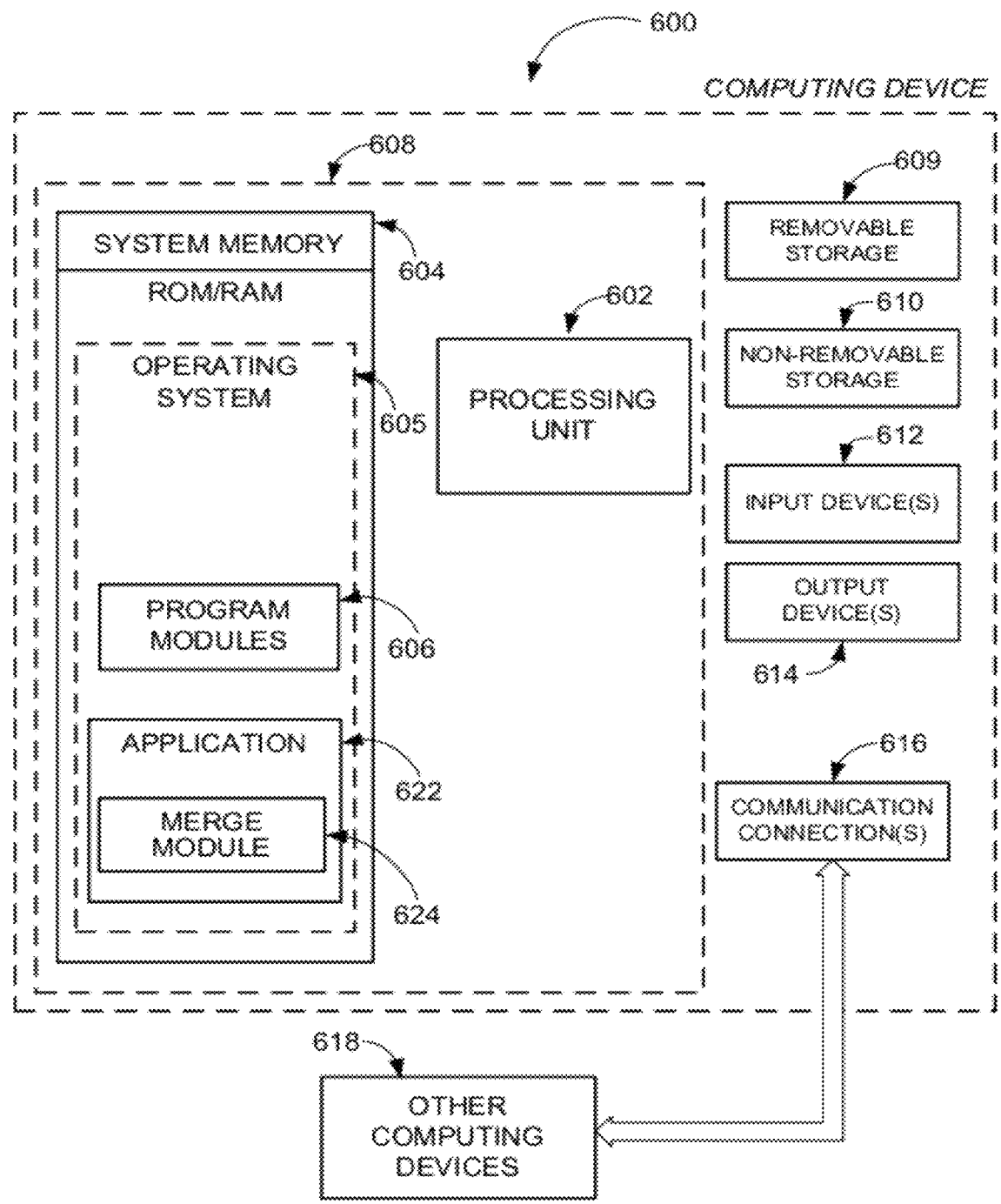
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of merging co-authored documents according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, application 622, and merge module 624.

Application 622 may process physical or virtual objects and their placement, for example placement of graphical objects in a word processing application, or placement of physical objects through robotic control. Through an interface controlled by merge module 624, application 622 may enable preservation of user intent in merging changes to the ordered objects by one or more users including rearrangements, additions, and/or removals. Application 622 and merge module 624 may be separate application or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some, or none at all. These human operators need not be collocated with each other, but each can be only with a machine that performs a portion of the program.

Figure 7:
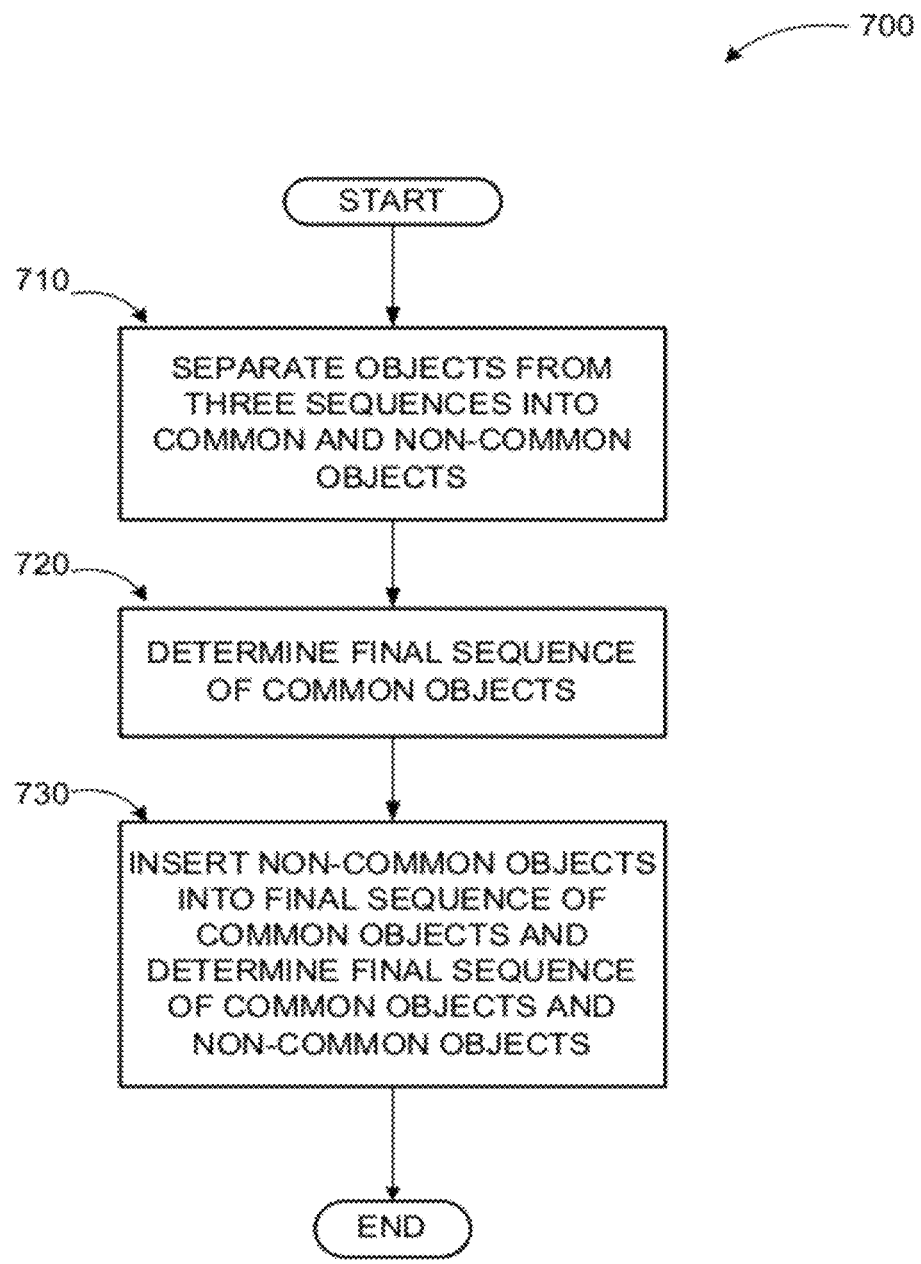
FIG. 7 illustrates a logic flow diagram for a process of determining an arrangement of objects in co-authored documents using common and non-common object classification according to embodiments.

FIG. 7 illustrates a logic flow diagram for process 700 of merging the ordering of objects according to embodiments. Process 700 may be implemented on a server or other computing device.

Process 700 begins with operation 710, where objects in the base sequence, and two derived sequences are identified as common objects and non-common objects based on their presence in the sequences. Upon identifying the common objects and non-common objects, at operation 720, a final sequence of common objects is determined representing changes made to the base sequence. At operation 730, the non-common objects and common objects are merged preserving relative positioning to the common objects from respective derived sequences, where the common objects originated, and the final sequence of the entire set of common and non-common objects may be determined by rearranging the non-common objects in the final sequence based on the relative positioning of the non-common objects to the common objects in each of the derived sequences. This may be accomplished by moving non-common objects forward or backward until the relative positioning is preserved.

FIG. 8 illustrates a logic flow diagram for process 800 for the algorithm of determining a final sequence of common objects when merging changes to a base sequence from primary and secondary derived sequences corresponding to operation 730 in process 700. Process 800 may be implemented on a server or other computing device.

Process 800 begins with operation 805, where user derived sequences are designated as primary derived sequence and secondary derived sequences. At operation 810, groups of contiguous objects that have the same order as in the base sequence are identified in the primary derived sequence. At least some of the groups may also include a single object. At operation 820, a matching contiguous group of objects is identified in the secondary derived sequence, which is a permutation of the contiguous group identified in the primary derived sequence. Operations 830 and 840 identify which sequence's order of common objects should be used in the final sequence. At operation 830, the solution determines if the contiguous permutation group exists in the secondary derived sequence, and if so, then the order of the group in the secondary sequence is used to determine the order in the final sequence. At operation 840, the contiguous group in the primary derived sequence is used to determine the order in the final sequence if the contiguous permutation does not exist in the secondary derived sequence. Operations 820 through 840 may be executed for each group identified at operation 810 in the primary sequence. At operation 850, the final sequence of common objects from the base, primary derived, and secondary derived sequences is determined.

Figure 9:
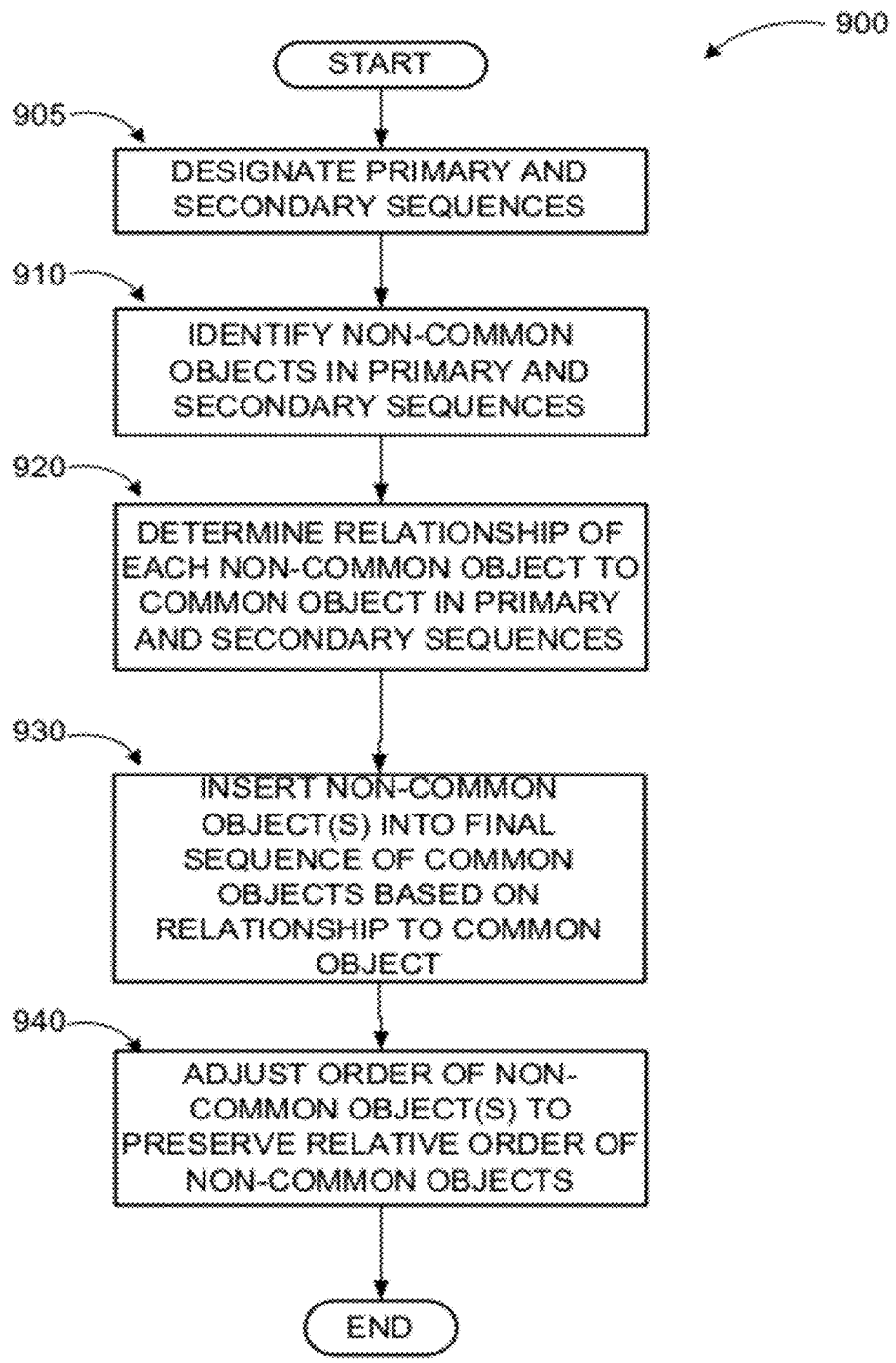
FIG. 9 illustrates a logic flow diagram for determining the final order of common and non-common objects in co-authored documents according to embodiments.

FIG. 9 illustrates a logic flow diagram for process 900 for the algorithm of determining a final sequence of common objects and non-common objects based on inserting and arranging non-common objects into a final sequence of common objects when merging changes to a base sequence from two derived sequences corresponding to operation 730 in process 700. Process 900 may be implemented on a server or other computing device.

Process 900 begins with operation 905, where user derived sequences are designated as primary derived sequence and secondary derived sequences. At operation 910, non-common objects are identified in the base sequence, and the primary and secondary derived sequences. At operation 920, the relationship of each non-common object to a common object in the same sequence is determined. This is accomplished by determining the relative position of the non-common objects to the common objects by identifying if a non-common object is directly before or directly after a specific common object. Upon determining the relative position of each non-common object in each of the derived sequences, at operation 930, the non-common objects are inserted into the final sequence of common objects as determined using process 800. This operation preserves the relationship of the non-common objects to the common objects in respective derived sequences by inserting each non-common object directly before or after the common object which it is directly before or after in the secondary sequence. The process aims to maintain the relative order of non-common objects that originate from a derived sequence, such that at operation 940, the non-common objects are rearranged by moving a non-common object forward or backward in order to return the non-common objects to their relative order in each derived sequence. The operation is applied to the primary derived sequence and the secondary derived sequence in order to insert non-common objects from both sequences into the final sequence of common objects.

The operations included in processes 700, 800, and 900 are for illustration purposes. Determination of sequences for merging ordered objects may be implemented by similar processes with fewer or additional steps, as well as in different order of operations using the principles described herein. Furthermore, some operations may be combined into a single operation or others may be separated into multiple operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for merging sequences of ordered objects, the method comprising:
   determining common and non-common objects from a collaboratively authored document among a base and two derived sequences, wherein the base sequence is an original sequence of the ordered objects from a master version of the collaboratively authored document and the two sequences are derived from the original sequence based on addition, removal, and reorder of the objects to a modified version of the collaboratively authored document;
   merging a z-position of the common and non-common objects in relation to each other according to a z-order on z-axis, by:
   determining a final sequence of the common objects on the z-axis, wherein objects along the z-axis include one or more of: overlapping objects, embedded objects and overlaid graphics; and
   determining a final sequence of all objects based on positioning the non-common objects relative to the common objects in their respective sequences on the z-axis, wherein the final sequence represents changes made by two or more users to the base sequence of the collaboratively authored document including rearranged objects, new objects, and removed objects across the z-axis.

2. The method of claim 1, further comprising:
designating one of the two derived sequences as "primary" and the other as "secondary";
separating the primary sequence of objects into groups of one or more contiguous objects whose internal order matches the base sequence's order;
for each group of objects in the primary sequence, determining whether a matching group exists in the secondary sequence that is a permutation of the primary sequence's group; and
if a matching group exists, forming the final sequence of common objects using the matching group; else
using the group from the primary sequence to form the final sequence of common objects.

3. The method of claim 2, wherein determining the final sequence of all objects includes:
for each non-common object, determining a common object positioned immediately prior to the non-common object in each of the base, primary, and secondary sequences; and
inserting the non-common object immediately following the common object in the final sequence of common objects.

4. The method of claim 2, wherein determining the final sequence of all objects includes:
for each non-common object, determining a common object positioned immediately following the non-common object in each of the base, primary, and secondary sequences; and
inserting the non-common object immediately prior to the common object in the final sequence of common objects.

5. The method of claim 2, wherein preserving an order of the non-common objects in the final sequence of all objects includes one of:
pushing backward non-common objects that are out of position until an internal order of the non-common objects is restored; and
pushing forward non-common objects that are out of position until the internal order of the non-common objects is restored.

6. The method of claim 5, further comprising:
if an order of two non-common objects originating from different input sequences cannot be determined relative to each other, consistently selecting one of the primary and secondary sequences to have precedence such that a non-common object originating from one of the primary and secondary sequences is positioned following a non-common object originating from another one of the primary and secondary sequences.

7. The method of claim 2, wherein the common objects appear in the base, primary, and secondary sequences.

8. The method of claim 2, wherein the non-common objects are missing in at least one of the base, primary, and secondary sequences.

9. The method of claim 1, wherein the objects include one of a virtual object and a physical object.

10. The method of claim 1, wherein the final sequence of common objects represents a sequence of objects in the base sequence rearranged by operations resulting in the two derived sequences.

11. A computing device for executing an application adapted to merge sequences of ordered objects, the computing device comprising:
a memory with instructions stored thereon;
a processor coupled to the memory executing a merge module through an interface at a co-authoring application configured to preserve a user intent of ordered objects from multiple versions in a merged sequence of a collaboratively authored document, wherein the merge module, when executing the instructions, is configured to:
identify multiple versions of the collaboratively authored document, wherein each version includes a unique arrangement of objects;
separate objects in each version of the collaboratively authored document into common and non-common objects;
determine a base and two derived sequences from the separated objects from the collaboratively authored document, wherein the base sequence is an original sequence of the ordered objects and the two sequences are derived from the original sequence based on addition, removal, and reorder of the objects;
designate one of the two derived sequences as a "primary" sequence and the other as a "secondary" sequence;
merge x and y positions of the common and non-common objects independent of each other on x and y axis;
merge a z-position of the common and non-common objects in relation to each other according to a z-order on z-axis;
determine a final sequence of the common objects, wherein objects along the z-axis include one or more of: overlapping objects, embedded objects and an overlaid graph;
determine a final sequence of all objects based on positioning the non-common objects relative to the common objects in their respective sequences, wherein the final sequence represents both derived sequences' changes to the base sequence and preserves a user intent of the ordered objects; and
if there is a conflict between changes to the base sequence represented in the derived sequences, using the changes from the designated primary sequence in the final sequence.

12. The computing device of claim 11, wherein the processor is further configured to:
separate the primary sequence of objects into groups of one or more contiguous objects whose internal order matches the base sequence's order;
for each group of objects in the primary sequence, determine whether a matching group exists in the secondary sequence that is a permutation of the primary sequence's group; and
if a matching group exists, form the final sequence of common objects using the matching group; else
use the group from the primary sequence to form the final sequence of common objects.

13. The computing device of claim 12, wherein the processor is further configured to:
for each non-common object, determine a common object positioned immediately one of prior to and following the non-common object in each of the base, primary, and secondary sequences; and
insert the non-common object immediately one of following and prior to the common object in the final sequence of common objects.

14. The computing device of claim 13, wherein the processor is further configured to:
preserve an order of the non-common objects in the final sequence of all objects by one of:
pushing backward non-common objects that are out of position until an internal order of the non-common objects is restored; and pushing forward non-common objects that are out of position until the internal order of the non-common objects is restored.

15. The computing device of claim 13, wherein the processor is further configured to:
consistently select one of the primary and secondary sequences to have precedence such that a non-common object originating from one of the primary and secondary sequences is positioned following a non-common object originating from another one of the primary and secondary sequences.

16. The computing device of claim 11, further comprising a data store for storing data associated with the base sequence of the ordered objects.

17. A computer-readable memory device with instructions stored thereon for determining a final sequence of objects representing a merger of co-authored documents, the instructions comprising:
identifying multiple versions of a co-authored document through an interface controlled by a merge module and identifying sequences of objects included in the multiple versions of the document;
designating a base sequence of objects representing a last common version of the document, a primary sequence of objects representing an ordering of objects in the document prior to a latest save operation, and a secondary sequence of objects representing a latest version of the document cached at a server at the merge module;
separating the sequences of objects from each version into common and non-common objects;
merging x and y positions of the objects independent of each other on x and y axis employing the merge module;
merging a z position of the objects in relation to each other according to a z-order on z-axis by:
determining common and non-common objects among the base, primary, and secondary sequences on the z-axis, wherein objects along the z-axis include one or more of: overlapping objects, embedded objects and overlaid graphics;
separating the primary sequence of objects into groups of contiguous objects whose internal order matches the base sequence's order on the z-axis, wherein at least one group includes a single object;
for each group of objects in the primary sequence, determining whether a matching group exists in the secondary sequence that is a permutation of the primary sequence's group of contiguous objects;
if a matching group exists, forming a final sequence of common objects based on the matching group; else
forming the final sequence of common objects based on the group from the primary sequence;
for each non-common object, determining a common object positioned immediately one of prior to and following the non-common object in each of the base, primary, and secondary sequences; and
inserting the non-common object immediately one of following and prior to the common object in a final sequence of common objects, wherein the final sequence represents changes made by two or more users to the base sequence of the co-authored document including rearranged objects, new objects, and removed objects across the z-axis and the merger preserving user intent of the multiple versions of the co-authored document.

18. The computer-readable memory device of claim 17, wherein the common objects appear in the base, primary, and secondary sequences, and the non-common objects are missing in at least one of the base, primary, and secondary sequences.

19. The computer-readable memory device of claim 17, wherein an order of the objects is along Z axis in relation to a document page plane.

20. The computer-readable memory device of claim 17, wherein the objects are graphical objects.

* * * * *